United States Patent [19]

Papp

[11] Patent Number: 4,463,666
[45] Date of Patent: Aug. 7, 1984

[54] EGG SEPARATOR

[76] Inventor: Julius F. Papp, Lakeway, Purdys Station, N.Y. 10578

[21] Appl. No.: 450,467

[22] Filed: Dec. 16, 1982

Related U.S. Application Data

[63] Continuation of Ser. No. 32,995, Apr. 25, 1979, abandoned.

[51] Int. Cl.$^3$ .......................... A23J 1/09; A47J 43/14
[52] U.S. Cl. ......................................... 99/497; 99/495
[58] Field of Search ................................. 99/495–500, 99/506, 508; D7/48, 99

[56] References Cited

U.S. PATENT DOCUMENTS 1,896,498  2/1933  Taniguchi ............................ 99/497
2,212,328  8/1940  Scurlock ............................. 99/497

Primary Examiner—Timothy F. Simone
Attorney, Agent, or Firm—Peter K. Kontler

[57] ABSTRACT

An egg separator has a receptacle with a bottom wall which slopes towards the center where there is a tubular hollow upright provided with circumferentially spaced openings leading to a center discharge hole for the egg whites, the yolks being held back at the openings. The separator is especially well suited for separating several eggs at one and the same time.

5 Claims, 2 Drawing Figures

U.S. Patent  Aug. 7, 1984  4,463,666 cc# EGG SEPARATOR

This application is a continuation of application Ser. No. 32,995, filed Apr. 25, 1979 now abandoned.

BACKGROUND OF THE INVENTION

1. Field of the Invention

This invention relates to an egg separator, i.e. to a device for separating egg yolks from egg whites.

A more particular aspect of the invention resides in an egg separator which is capable of separating the whites and yolks of two or more eggs at once.

2. The Prior Art

The conventional, and still most widely practised way of separating the white of an egg from the yolk, is to crack the egg, separate the shell into two halves, and then pour the egg white and yolk back and forth between these halves until the desired separation is achieved. This requires a certain dexterity not possessed by everyone, is time-consuming and tends to be "messy". If several eggs are to be done this way, the process must be repeated for each egg.

Egg-separating devices have been proposed to overcome these problems. Generally, they do not work well, requiring as much work as the conventional method and and offering no protection against yolk breakage. One, a cup having in its circumferential wall a slot through which the egg white is poured out after the egg is first broken into the cup, works somewhat better, but I am not aware of any egg-separators which offer really good performance and are able to separate with equal success the whites and yolks of either one egg alone or of a plurality of eggs at one time.

SUMMARY OF THE INVENTION

Accordingly, it is an object of the invention to overcome the disadvantages of the prior art.

More particularly, it is an object of the invention to provide an improved egg separator which avoids those disadvantages.

Still more specifically, it is an object of the invention to provide an egg separator which is capable, with equal facility, of separating the white and yolk of a single egg, and of separating the whites and yolks of a plurality (i.e. two or more) eggs at once.

Another object is to provide such an egg separator which is inexpensive to produce and which can, therefore, be marketed at reasonable cost.

A concomitant object is to provide an egg separator of the type under discussion, which is self-contained in that it requires no extraneous containers for the separated egg whites or yolks.

Pursuant to the above objects, and still others which will become apparent hereafter, one aspect of the invention resides in an egg separator, particularly for separating a plurality of eggs at once. Briefly stated, this separator may comprise an upright receptacle having a circumferential wall and a bottom wall which is provided with a center opening and tapers from the circumferential wall downwardly in direction towards the opening; and a tubular upright surrounding the opening and having a lower edge connected to the bottom wall, the lower edge being provided with a plurality of circumferentially spaced cut-outs through which the interior of the receptacle communicates with the openings so that, when one or more broken eggs are placed in the interior, the egg whites will run off through the cut-outs and opening whereas the unbroken egg yolks will be retained at the cut-outs for subsequent removal from the interior.

The novel features which are considered as characteristic for the invention are set forth in the appended claims. Both the construction and method of operation of the invention, as well as additional objects and advantages thereof, will however be best understood from the following description of specific embodiments in connection with the accompanying drawings.

DESCRIPTION OF PREFERRED EMBODIMENTS

Figure 1:
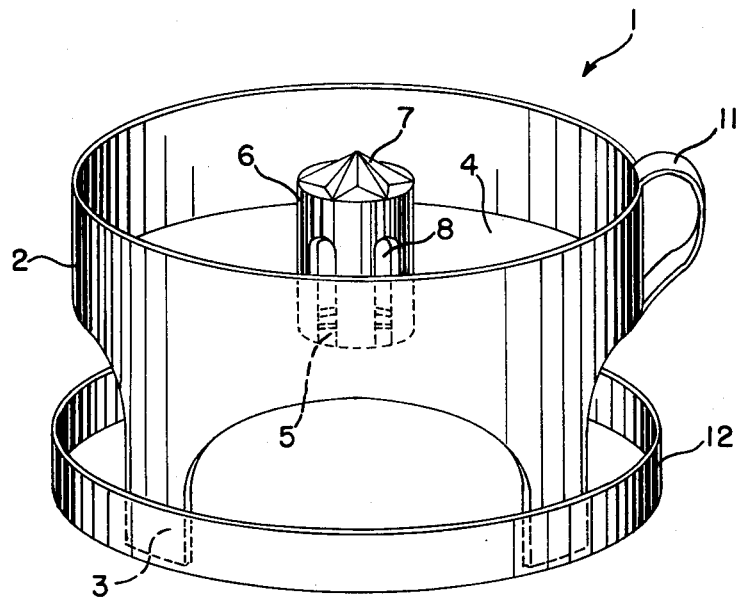
FIG. 1 is a top perspective view, illustrating an egg separator embodying the invention.
Figure 2:
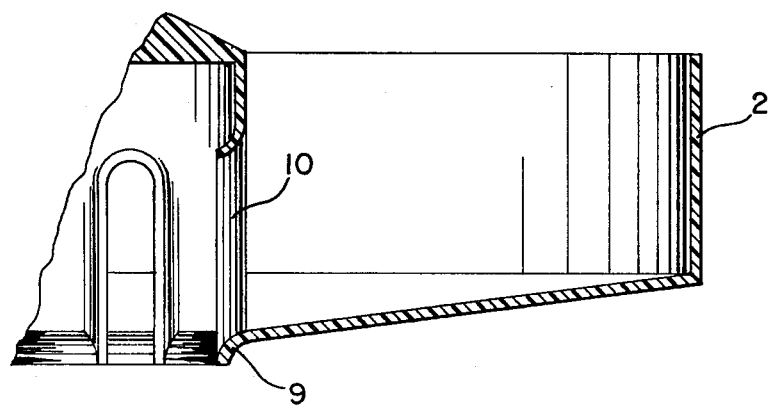
FIG. 2 is a section taken on line II—II of FIG. 1.

One exemplary embodiment of the inventive egg separator is illustrated in FIGS. 1 and 2. In these Figures the egg separator is designated in toto with reference numeral 1. It has a container including a circumferential wall 2 provided with legs 3 of any desired shape and in a number requisite to keep the container in upright position. However, the legs 3 could be omitted, in which case the container would simply rest on the lower edge of wall 2.

The container further has a bottom wall 4 which is provided with a central opening 5. The dimensions of the opening 5 are not important, except that they must, of course, be such as to permit proper run-off of egg white. They may be empirically determined without undue experimentation, depending upon the number of eggs the separator is intended to be capable of handling at one and the same time. For the container having an inner diameter of about $5\frac{1}{4}$ inches, I currently prefer the diameter of opening 5 to be about 1 inch.

Mounted on the wall 4, so as to surround the opening 5, is a tubular upright 6. This may be suitably secured to the bottom wall 4 (e.g. adhesively, by heat-welding or the like) or it may be of one piece therewith. The top of the upright 6 may be open or have a transverse wall closing it. In a particularly advantageous embodiment this transverse wall may be shaped to form a projection or "bump" 7 on which a user can crack the eggs to be separated. If, as in the illustrated embodiment, a lid (still to be discussed) is provided for the container, the upright 6, 7 should not extend upwardly beyond the upper edge of wall 2, so as not to interfere with placement of the lid. Otherwise, of course, this prohibition does not apply.

The lower marginal region of the upright 6 is provided with one or more cut-outs 8; although a single such cut-out might be provided, a series of circumferentially spaced cut-outs 8 is in practice preferred to afford more rapid draining of the egg whites. The inner circumferential edge 9 of the bottom wall 4, i.e. the portion bounding the opening 5, is tapered downwardly in the manner of a funnel to facilitate egg-white run-off; for the same reason the lateral edge portions 10 of upright 6, i.e. those which bound the opposite sides of the cut-outs 8, are curved gently inwardly of the upright 6. The bottom wall 4 is tapered downwardly from the circumferential wall 2 towards the opening 5 (see FIG. 2) at a pitch angle of about $\frac{1}{2}$ inch (if the diameter of receptacle 1 is about $5\frac{1}{4}$ inches) as already mentioned. This taper, together with the taper of portion 9 and the curvature of the portion 10, assures that when one or more eggs are broken into the container 1 the whites as well as the yolks will flow towards the upright 6. The whites, of course, can flow through the cut-outs 8, their movement facilitated by the shaping of the portions 9 and 10; the unbroken yolks, however, will be retained by the upright 6 because they are too big to flow through the cut-outs 8 and being unbroken, are prevented by the yolk membrane from accomodating their shape sufficiently to the cut-outs to flow through the latter. The bottom wall 4 should not be pitched too sharply, to avoid rupturing of the membrane due to pressing of the yolks against the sides of the cut-outs 8. When the egg whites have drained off, the retained yolks can be removed from the container, e.g. poured into another receptacle.

The separating process is particularly simplified by the device according to the invention when several eggs are to undergo separation. Depending upon the size of the receptacle a user may break five, ten or even more eggs at a time into the container 1. Since no further actions are required of the user, he or she can proceed to carry out some other task, leaving the egg whites to drain off by themselves, and can return after a short time to find the separated yolks waiting for further use. Especially in a commercial context, where dozens or hundreds of eggs must often be separated per unit time, the separator according to the invention can be an invaluable aid since eggs can now be separated in large batches and without requiring any attention from an operator during the separation process.

The container 1 may be provided with a handle, as indicated at 11, but the handle could also be omitted.

The lid 12 shown in the drawing has a dual function. It covers the container 1 when the same is not in use; i.e. it overlies the open top of the container 1. In fact, if desired, a screw-closure or bayonet-closure may be provided on the lid 12 and wall 2, respectively, or else a friction fit may be chosen to hold the lid in place. When the separator is to be used, the lid 12 is removed and placed in inverted position beneath the container 1, so that it now acts as a catch tray in which the draining egg whites are collected. Of course, the circumferential edge of the lid 12 must be made sufficiently high for this purpose; its exact height will depend upon the size of the container, i.e. upon the number of eggs which can be broken into the container for separation at one and the same time. If the container has a 5¼ inch diameter, then the edge of lid 12 should be about 1¼ inches high although this, of course, is not to be considered limiting.

The lid could be omitted entirely, or else it could be provided as a true lid, i.e. having only the purpose of closing the top of the container and not to act as a catch tray. In either of these cases a user might supply his or her own receptacle to place beneath the container, or a separate receptacle—e.g., cup-shaped—could be supplied with the container.

The container and lid may be made of any suitable material, including metal and synthetic plastic material (e.g. vinyl, polyethylene, styrene). If synthetic plastic material is used, the container and/or lid may be produced by any of several known-per-se methods, for example by injection molding or vacuum-forming. If more convenient, the container 1 need not be made of one piece; for example, the upright 6 could be made as a separate element and subsequently secured to the container as already indicated. It goes without saying that the separator also need not be made of a single material; for example, the container 1 could be made of metal and the lid 12 of synthetic plastic material, to mention just one possibility.

While the invention has been illustrated and described as embodied in an egg separator, it is not intended to be limited to the details shown, since modifications and structural changes may be made without departing from the spirit of the invention.

What is claimed as new and desired to be protected by Letters Patent is set forth in the appended claims:

1. A device for simultaneously separating the egg whites and egg yolks of a plurality of eggs without causing breakage of the yolks, comprising a first component constituting a dished receptacle including a circumferential wall and a circumferentially complete annular bottom wall having a central opening and a smooth frustoconical top surface which tapers from said circumferential wall downwardly and inwardly toward said opening; and a second component constituting an upright having a lower edge portion connected to said bottom wall circumambiently of and at the edge bounding said opening, said edge portion having at least one cutout through which the interior of said receptacle communicates with said opening and which is disposed at a level above the radially innermost portion of said top surface, the dimensions of said cutout being such that, when yolks and whites of broken eggs are placed onto the top surface of said bottom wall, the egg whites will run off along said bottom wall to and through said cutout and said opening whereas the upright will intercept unbroken yolks for subsequent removal from the interior of said receptacle.

2. The device of claim 1, wherein said top surface tapers downwardly from said circumferential wall by about ¼ inch.

3. The device of claim 1, wherein said cutout has a width of about ½ inch, as considered in the circumferential direction of said upright.

4. The device of claim 1, wherein said bottom wall is circular and has a diameter of about 5¼ inches.

5. The device of claim 1, wherein at least one of said components consists of synthetic plastic material.

* * * * *